United States Patent
Kobayakawa et al.

(10) Patent No.: US 8,203,648 B2
(45) Date of Patent: Jun. 19, 2012

(54) MOTION VECTOR DETECTING APPARATUS AND MOTION VECTOR DETECTING METHOD

(75) Inventors: Takahiro Kobayakawa, Fukuoka (JP); Masaru Inoue, Fukuoka (JP); Akikazu Maehara, Fukuoka (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1253 days.

(21) Appl. No.: 11/907,701

(22) Filed: Oct. 16, 2007

(65) Prior Publication Data

US 2008/0130751 A1    Jun. 5, 2008

(30) Foreign Application Priority Data

Nov. 30, 2006   (JP) ................................. 2006-322990

(51) Int. Cl.
*H04N 7/12*   (2006.01)
(52) U.S. Cl. ................................. 348/413.1; 375/240.16
(58) Field of Classification Search .................. 348/106, 348/413, 420, 426, 699; 375/240.16
See application file for complete search history.

(56) References Cited

U.S. PATENT DOCUMENTS

| | | | | |
|---|---|---|---|---|
| 5,253,056 A | * | 10/1993 | Puri et al. ................. | 375/240.01 |
| 5,473,378 A | * | 12/1995 | Tamitani ................... | 375/240.15 |
| 5,504,530 A | * | 4/1996 | Obikane et al. .......... | 375/240.14 |
| 5,510,840 A | * | 4/1996 | Yonemitsu et al. ...... | 375/240.15 |
| 5,754,243 A | * | 5/1998 | Kurihara et al. .............. | 348/445 |
| 5,841,475 A | * | 11/1998 | Kurihara et al. ......... | 375/240.15 |
| 6,263,112 B1 | | 7/2001 | Watanabe et al. | |
| 2002/0136299 A1 | | 9/2002 | Matsumura et al. | |

FOREIGN PATENT DOCUMENTS

| | | |
|---|---|---|
| JP | 7-231445 | 8/1995 |
| JP | 09-055940 | 2/1997 |
| JP | 10-174108 | 6/1998 |
| JP | 2002-218474 | 8/2002 |
| JP | 2004-072301 | 3/2004 |

OTHER PUBLICATIONS

Japanese Office Action for corresponding Japanese Application 2006-322990; dated Mar. 22, 2011.

\* cited by examiner

*Primary Examiner* — Ricky Ngo
*Assistant Examiner* — Phuongchau B Nguyen
(74) *Attorney, Agent, or Firm* — Staas & Halsey LLP (57) ABSTRACT

In encoding an interlace picture in a field picture, a motion-vector detecting apparatus changes over a reference picture of a P-picture in a field unit, and changes over a reference picture of a B-picture in a frame unit. Moreover, in detecting the motion vector in different predictive directions, the motion-vector detecting apparatus simultaneously carries out a process of the same reference picture by changing over original picture frames.

4 Claims, 12 Drawing Sheets

| ORIGINAL PICTURE | $B_{n-4}$ $B_{n-1}$ | $P_{n(T)}$ | $P_{n(B)}$ | $B_{n-2}$ $B_{n+1}$ | $B_{n-1}$ $B_{n+2}$ | $P_{n+3(T)}$ | $P_{n+3(B)}$ | $B_{n+1}$ $B_{n+4}$ | $B_{n+2}$ $B_{n+5}$ | $P_{n+6(T)}$ | $P_{n+6(B)}$ |
|---|---|---|---|---|---|---|---|---|---|---|---|
| REFERENCE PICTURE L0 | $P_{n-3}$ | $P_{n-3}$ | $P_{n-3(B)}$ $P_{n(T)}$ | $P_n$ | $P_n$ | $P_n$ | $P_{n(B)}$ $P_{n+3(T)}$ | $P_{n+3}$ | $P_{n+3}$ | $P_n$ | $P_{n+3(B)}$ $P_{n+6(T)}$ |
| REFERENCE PICTURE L1 | $P_{n-3}$ |  | — | $P_n$ | $P_n$ | — |  | $P_{n+3}$ | $P_{n+3}$ |  | — |

MOTION VECTOR DETECTING APPARATUS AND MOTION VECTOR DETECTING METHOD

BACKGROUND OF THE INVENTION

1. Field of the Invention

The present invention relates to a motion vector detecting apparatus and a motion vector detecting method.

2. Description of the Related Art

Conventionally, standards such as MPEG-1, MPEG-2, and MPEG-4 of the Motion Picture Experts Group (MPEG) of the International Organization for Standardization (ISO) and the International Electrotechnical Commission (IEC), and H.261, H.262, and H.264 of the International Telecommunication Union Telecommunication Standardization Sector (ITU-T) are widely used as a method for compression coding of motion picture information, in a motion picture distribution on a digital television, a digital versatile disk (DVD), and the Internet, and a motion picture storage in a digital camera.

These methods compress an information amount utilizing a characteristic of motion pictures, that "frames continuous in time have a high correlation". Specifically, to find the correlation, the methods detect a motion vector between an encoding frame and a reference frame that has a temporally anteroposterior relation with the encoding frame, for each processing unit (i.e., macro block: MB) of the encoding frame.

In the detection of the motion vector, a block matching calculation of a reference frame is carried out in the MB unit of the encoding frame, and an evaluation value showing a correlation level is calculated. In general, the same pixel data of original picture data and reference picture data are repeatedly required for each processing unit of the MB. Therefore, picture data for calculation is read out after the picture data is transferred from a frame memory to an original picture memory and a reference picture memory in a large-scale integration (LSI).

The reference picture data, however, occupies a large transfer area from the frame memory in the MB unit, and the areas of the reference picture data overlap in the transition of the MB process, when observed in the frame unit. The data amount repeatedly read from the frame memory is not small. Because the overhead of the reference picture data increases a bandwidth of the frame memory and power consumption, an attempt is made to achieve lower power consumption by suppressing the bandwidth (for example, see Japanese Patent Application Laid-open No. H7-231445).

To suppress the bandwidth as described above, the following method is considered. A prefetch memory is provided between an external memory and a static random access memory (SRAM) for block matching calculation. Data having a high possibility of being read frequently is stored within the prefetch memory. The data stored in the prefetch memory is transferred from this memory to the internal SRAM for block matching calculation, whereby the amount of a transfer to the external memory is decreased.

However, even when the above method is used, at the time of detecting a motion vector, the same reference picture data is accessed frequently during processing of plural pieces of original picture data as well as during processing of one piece of original picture data. Therefore, utilization efficiency of the prefetch memory is low.

On the other hand, when a high constraint is set to a reference frame at the time of detecting a motion vector by prioritizing the utilization efficiency of the prefetch memory, reference data having a high correlation with the original picture to be processed cannot be selected. As a result, the encoding efficiency decreases, and the picture quality is degraded.

SUMMARY OF THE INVENTION

It is an object of the present invention to at least partially solve the problems in the conventional technology.

According to one aspect of the present invention, in a motion vector detecting apparatus that temporarily stores a reference picture frame to be used to obtain a correlation for each process-unit square data of an original picture frame into a large-capacity prefetch memory configured by a static random access memory (SRAM) in a large-scale integration (LSI), from frame data of a motion picture stored in a frame memory, transfers the process-unit square data of the reference picture frame from the prefetch memory, and detects a motion vector for each process-unit square data of the original picture frame, the motion vector detecting apparatus includes a changeover unit that, in encoding an interlace picture in a field picture, changes over a reference picture of a P-picture in a field unit, and changes over a reference picture of a B-picture in a frame unit, and, in detecting the motion vector in different predictive directions, simultaneously carries out a process of the same reference picture by changing over original picture frames.

According to another aspect of the present invention, in a motion vector detecting method for a plurality of motion vector detecting apparatuses to detect a motion vector, the method includes controlling the motion-vector detecting apparatuses to process process-unit square data continuous in a vertical direction in parallel, and prefetching a search area of a common motion vector processed at the controlling.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below in detail with reference to the accompanying drawings. A configuration of a motion vector detecting apparatus according to a first embodiment of the present invention and effects of the first embodiment are sequentially explained. Next, a motion vector detecting apparatus according to a second embodiment of the present invention is explained. Lastly, cases in which the present invention is used and the invention is not used are compared with each other in a comparative example.

Figure 1:
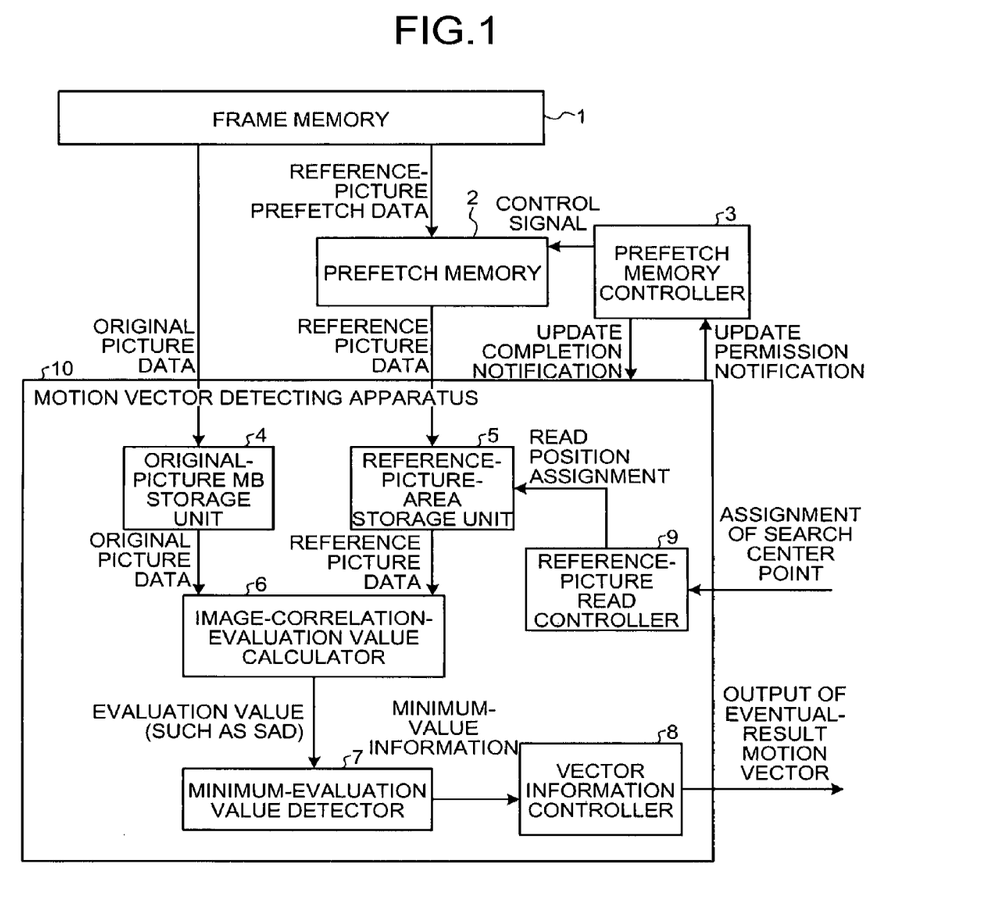
FIG. 1 is a block diagram of a configuration of a motion vector detecting apparatus using a prefetch memory according to a first embodiment of the present invention.
Figure 2A:
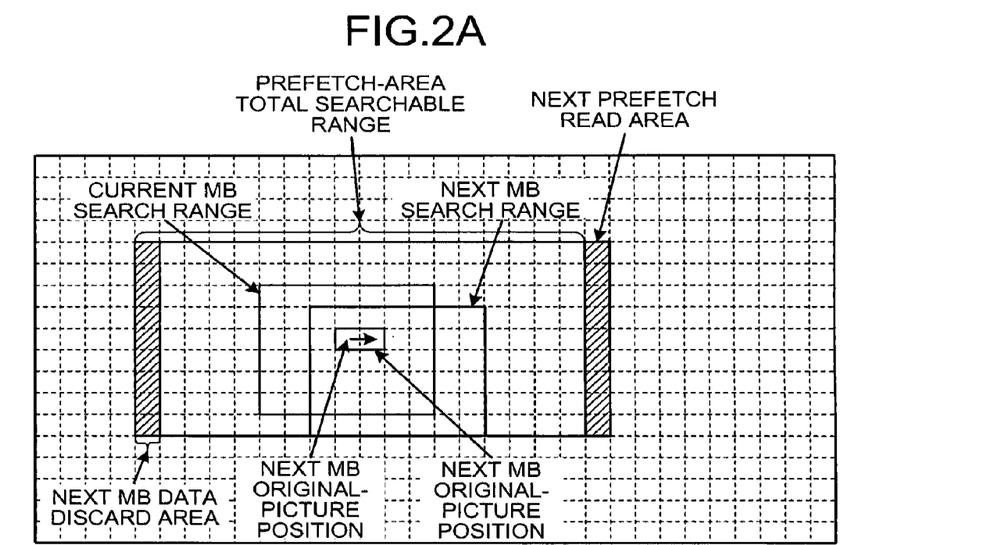
FIGS. 2A and 2B are schematic diagrams for explaining a motion-vector-search range area and a prefetch area according to the first embodiment.
Figure 2B:
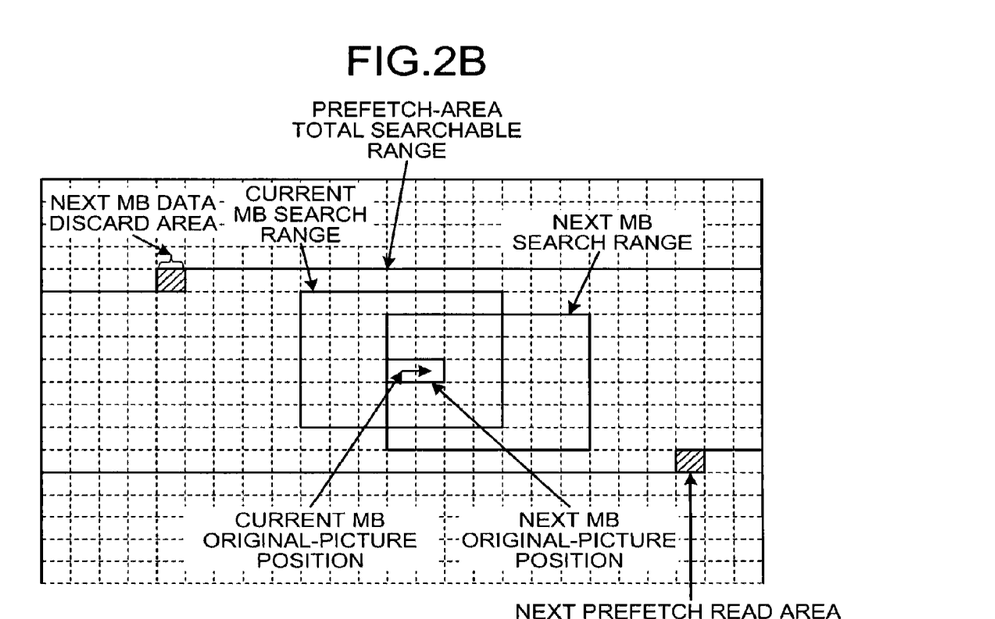
Figure 3:
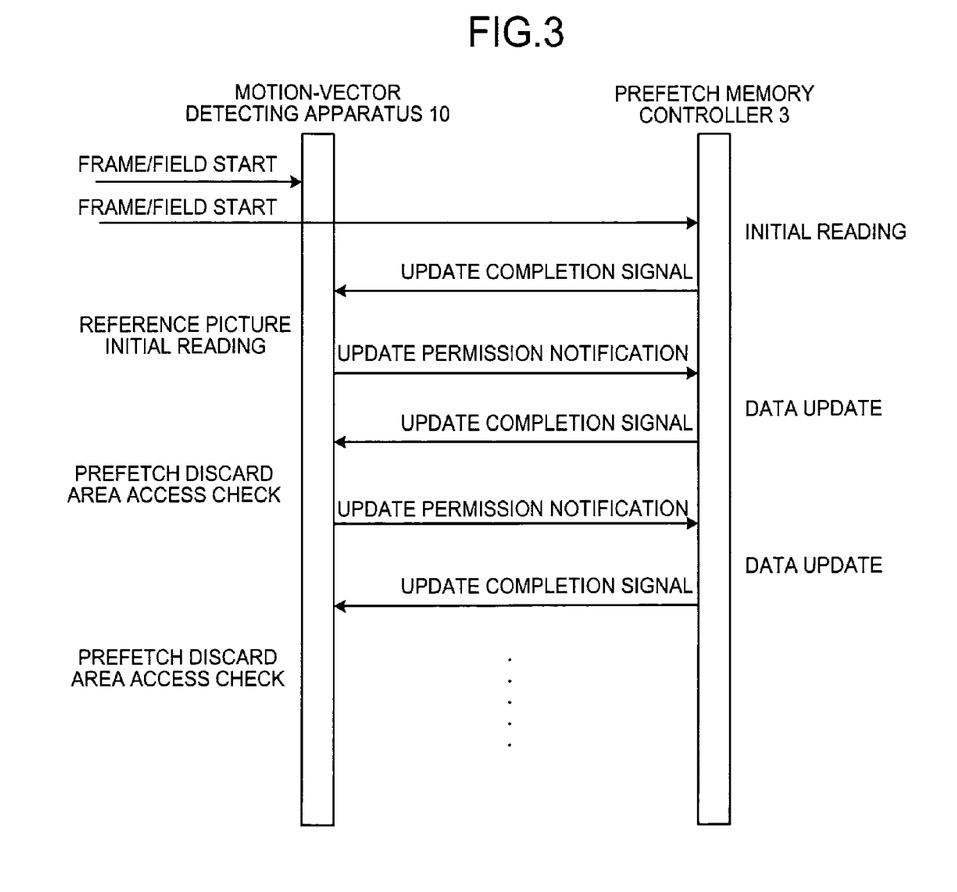
FIG. 3 is a sequence diagram for explaining an update process of data in the first embodiment.
Figure 4A:
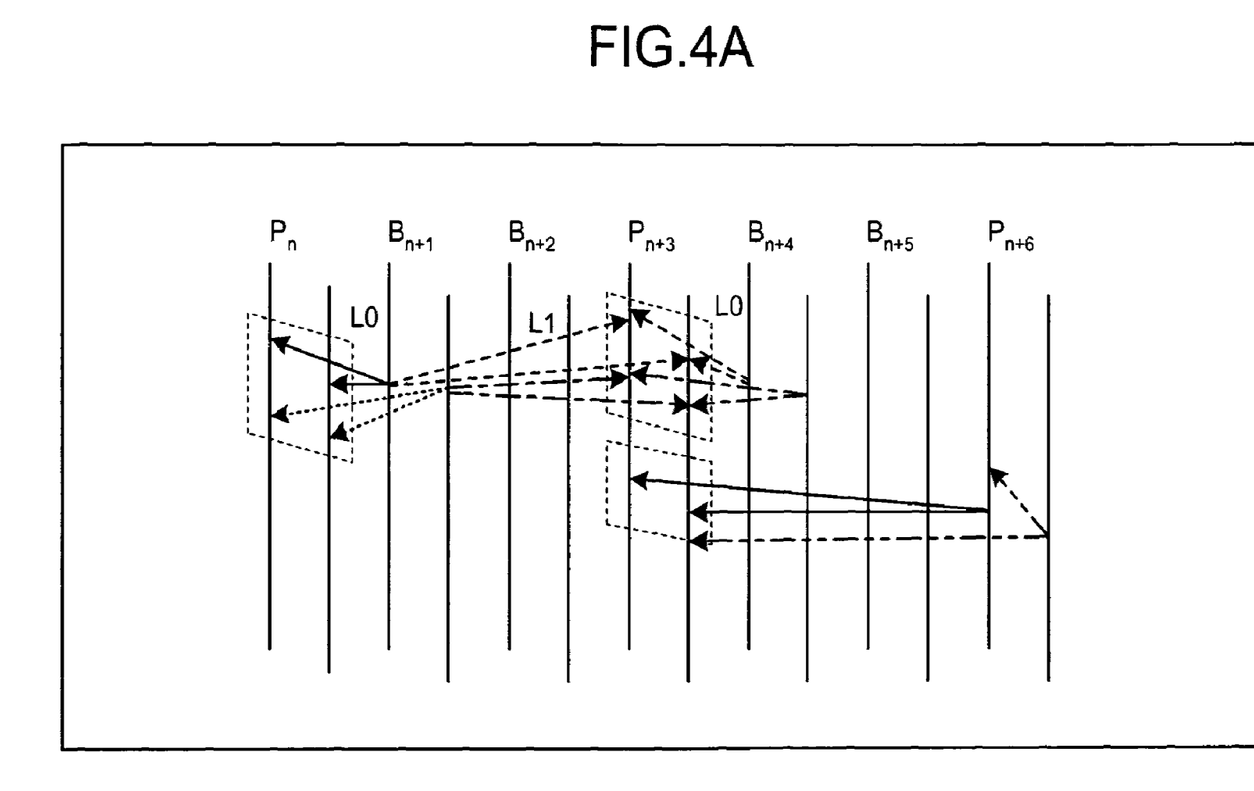
FIGS. 4A and 4B are schematic diagrams for explaining a changeover of a reference picture.
Figure 4B:
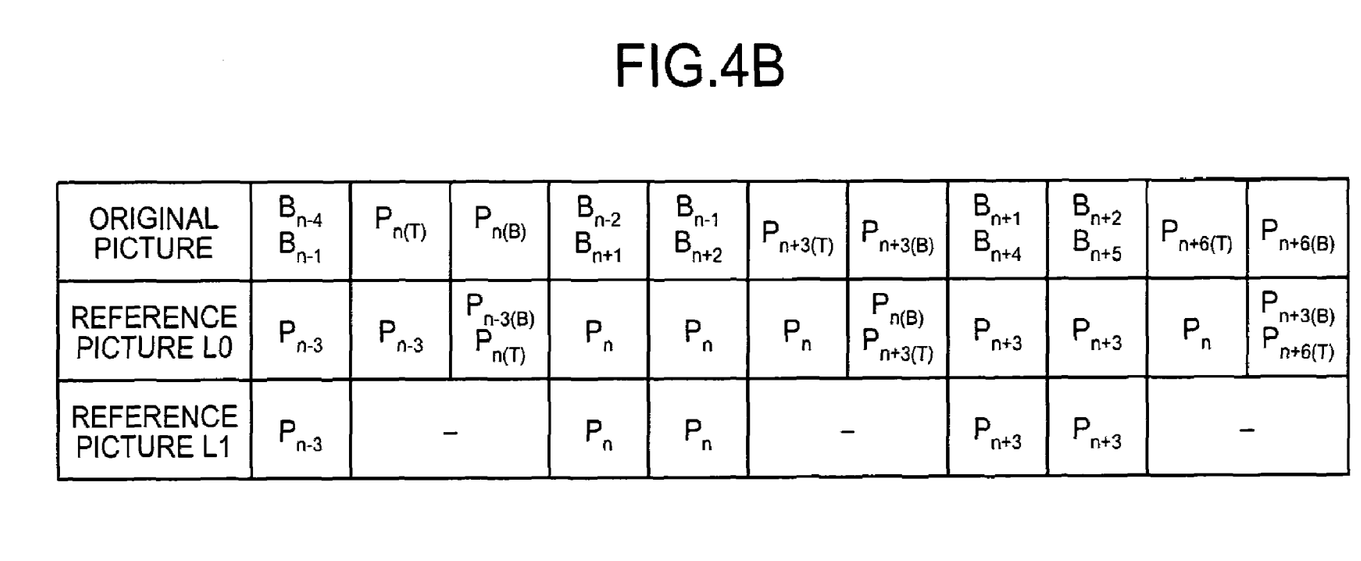
Figure 5:
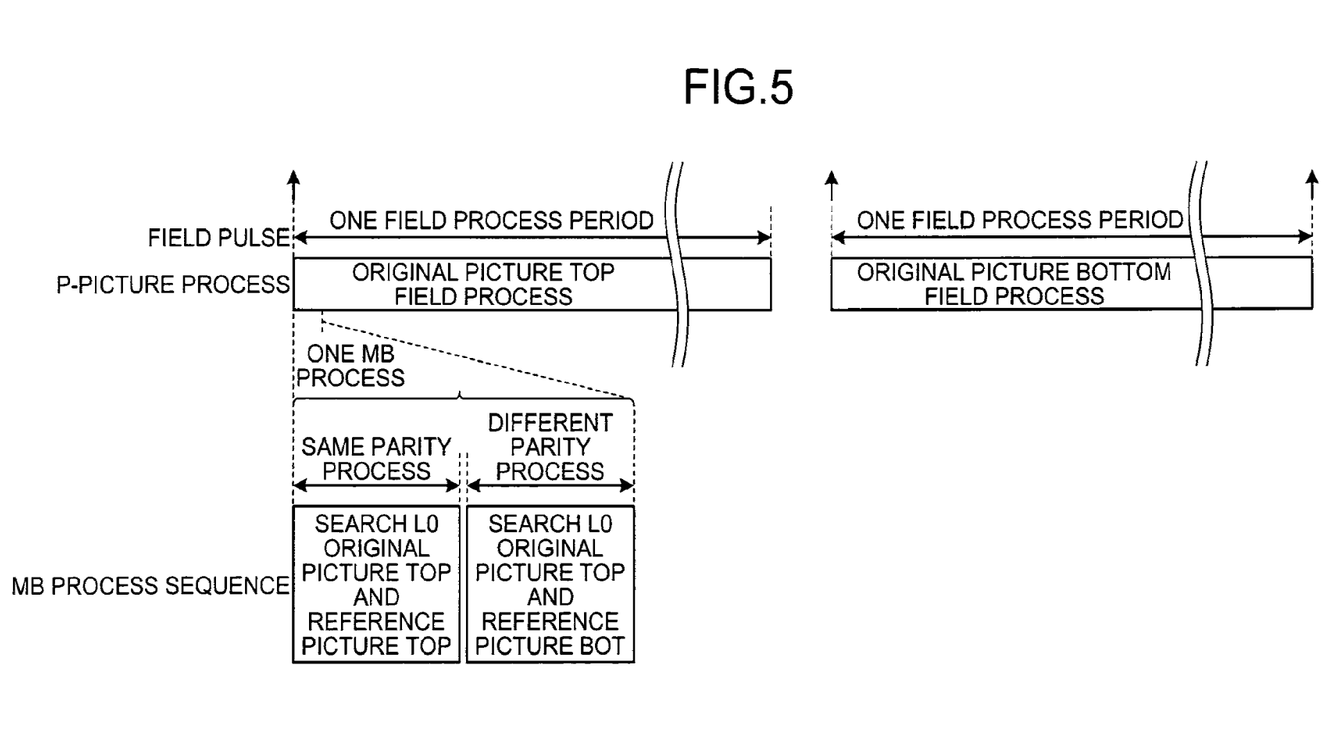
FIG. 5 is a sequence diagram for explaining a changeover process of a reference picture of P-Picture.
Figure 6:
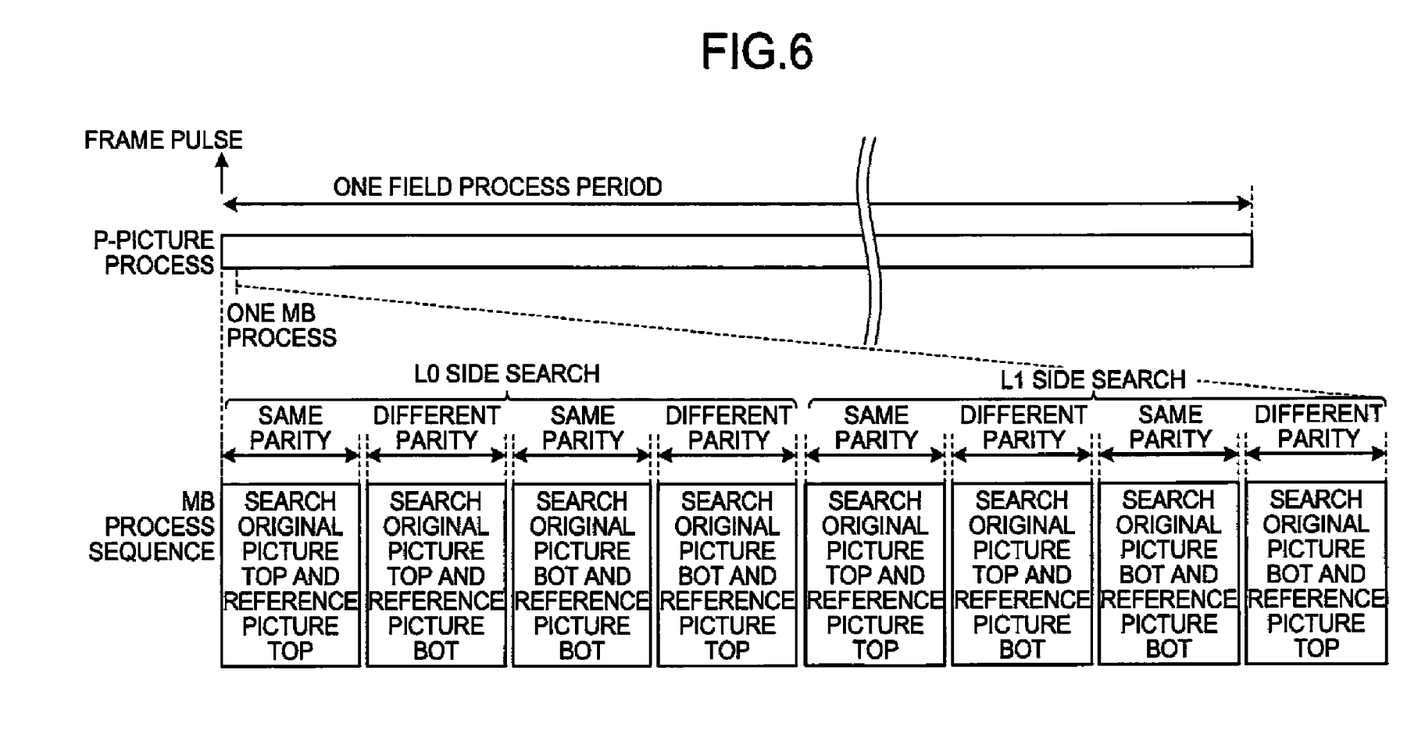
FIG. 6 is a sequence diagram for explaining a changeover process of a reference picture of B-Picture.

Firstly, the configuration of the motion vector detecting apparatus according to the first embodiment is explained with reference to FIGS. 1 to 6. FIG. 1 is a block diagram of the configuration of the motion vector detecting apparatus using a prefetch memory according to the first embodiment. FIGS. 2A and 2B are schematic diagrams for explaining a motion-vector-search range area and a prefetch area according to the first embodiment. FIG. 3 is a sequence diagram for explaining an update process of data in the first embodiment. FIGS. 4A and 4B are schematic diagrams for explaining a changeover of a reference picture. FIG. 5 is a sequence diagram for explaining a changeover process of a reference picture of P-Picture. FIG. 6 is a sequence diagram for explaining a changeover process of a reference picture of B-Picture.

A motion vector detecting apparatus 10 (see FIG. 1) according to the first embodiment includes an original picture MB storage unit 4, a reference-picture-area storage unit 5, an image-correlation-evaluation value calculator 6, a minimum-evaluation value detector 7, a vector information controller 8, and a reference-picture read controller 9.

In an MB process shown in FIG. 2A, the motion vector detecting apparatus 10 (see FIG. 1) according to the first embodiment transfers reference picture data in a search area (see "current MB search range" in FIG. 2A) around coordinates assigned from the outside (the CPU or the like), from a prefetch memory 2 to a reference picture memory corresponding to the reference-picture-area storage unit 5 of FIG. 1, thereby carrying out a block matching calculation. At this time, it is assumed that the prefetch memory 2 stores data of a maximum search area taking into account a range which can be assigned around an assigned search center. A search center point for each MB is determined by the CPU or the like, based on statistical information such as a peripheral MB and a preprocess motion vector search, and is given from the outside.

The motion vector detecting apparatus 10 determines about discarding of a discard area of an edge part of the maximum search range, and outputs an update permission notification of the prefetch to a prefetch memory controller 3, depending on whether the edge part is in a discardable state or whether the block matching process of the MB ends. Upon receiving the output, the prefetch memory controller 3 reads data of a part necessary for the maximum search range of the next MB process, from a frame memory 1. After reading the data, the prefetch memory controller 3 outputs an update completion notification to the motion vector detecting apparatus 10. The motion vector detecting apparatus 10 updates the reference picture data of the next MB (see "next MB search range" in FIG. 2A). When the prefetch memory is not present, a redundant part of the reference picture area in each MB process is read in double from the frame memory. When the updating is only for the prefetch memory, only the additional updating of the maximum search area based on the move of the original picture MB is sufficient (see "next prefetch Read area" in FIG. 2A).

When the capacity of the prefetch memory is large, or when a size of the process picture data in a horizontal direction is small, the updating of the prefetch as shown in FIG. 2B is carried out, thereby suppressing the amount of reading from the frame memory.

FIG. 3 depicts a sequence of data updating instruction and data updating completion executed between the prefetch memory controller 3 and the motion vector detecting apparatus 10.

The above explains the updating of prefetch data within one field/one frame. In the process period of plural fields/frames, a certain reference frame becomes reference picture data of plural frames (for example, see $P_{n+3}$ in FIG. 4A). When the duplication of the reference picture data between frames can be decreased, a transfer data amount between the frame memory 1 and the prefetch memory 2 can be further decreased.

In the process of a field picture, the process is carried out in a frame unit, and a block matching calculation is carried out by reading a common reference frame once. Specifically, original picture data is read for both fields in the MB processing unit. A common reference picture frame is searched in the process from "original picture Top" to "original picture Bottom".

However, in this case, the reference picture is fixed in a frame unit, and the reference picture in a field unit as the characteristic of the field picture process cannot be changed over. Accordingly, the encoding efficiency is decreased as compared with the encoding efficiency of a normal field picture. To improve the encoding efficiency and to suppress the memory bandwidth at the same time, in a P-picture process, the block matching is carried out in the field unit by prioritizing the encoding efficiency, and the reference picture is also changed over in the field unit. In a B-picture process, the process unit is changed over so that the above frame unit process is carried out (see FIGS. 4A and 4B).

In the B-Picture process, in the block matching of different predictive directions to share the reference picture, the original picture data is changed over to carry out the block matching process, using the reference picture in common. For example, as shown in FIG. 4B, in the block matching of different predictive directions (L0: a forward prediction, L1: a backward prediction), $P_{n+3}$ is a reference picture common to both an original picture $B_{n+1}$ and an original picture $B_{n+4}$.

FIG. 5 depicts a processing sequence of the P-Picture to which the above changeover process is applied. As shown in FIG. 5, in the P-Picture, only the changeover of a reference picture Field is carried out within one MB process, and the processing of one Field is completed with the start of the field unit. In other words, in the P-Picture, the reference picture can be changed over in the field unit.

FIG. 6 depicts a processing sequence of the B-Picture to which the above changeover process is applied. As shown in FIG. 6, in the B-Picture, the original picture data are changed over in the order of "L0-Top", "L0-Bottom", "L1-Top", and "L1-Bottom" in one MB process. The reference picture data is changed over for each original picture. This process is carried out for one frame based on the starting signal of the frame. In other words, in the B-Picture, the reference picture is changed over in the frame unit, and the same area is set as a reference picture in the Top Field and the Bottom Field of each frame. The searching of L0/L1 in the B-Picture is carried out by changing over the original picture data, and the searching of the common reference picture is carried out within the same processing time.

As described above, according to the first embodiment, when the encoding is performed on the field picture of the interlace picture, with respect to the P-picture, the reference picture is changed over in the field unit; whereas with respect to the B-picture, the reference picture is changed over in the frame unit. In the detection of the motion vector in different predictive directions, the process of the same reference picture is carried out simultaneously by changing over the original picture frames. Therefore, in the P-picture, the encoding efficiency increases. In the B-picture, the hit rate of the prefetch memory 2 becomes high. Therefore, the utilization efficiency of the prefetch memory 2 can be increased and degradation of picture quality can be avoided.

While the use of one motion-vector detecting apparatus is explained in the first embodiment, use of plural motion-vector detecting apparatuses is explained in the second embodiment.

Figure 7:
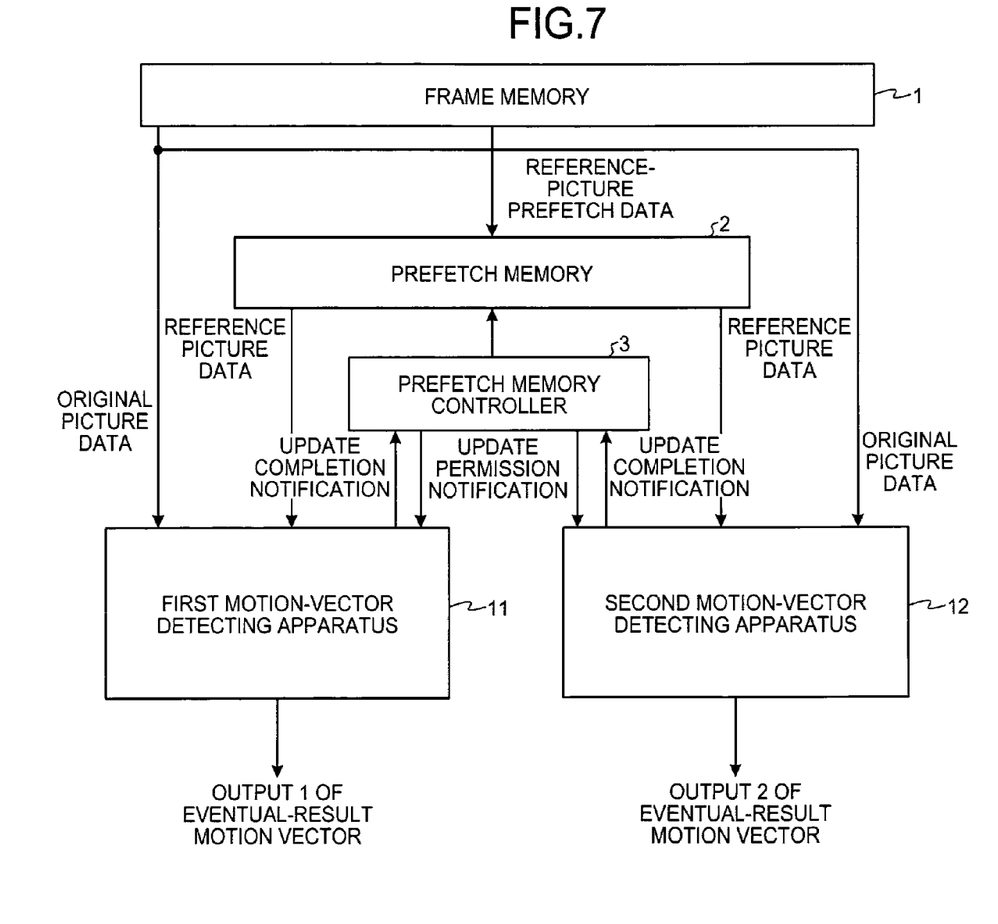
FIG. 7 is a block diagram of a configuration of a motion vector detecting apparatus using a prefetch memory according to a second embodiment of the present invention.
Figure 8A:
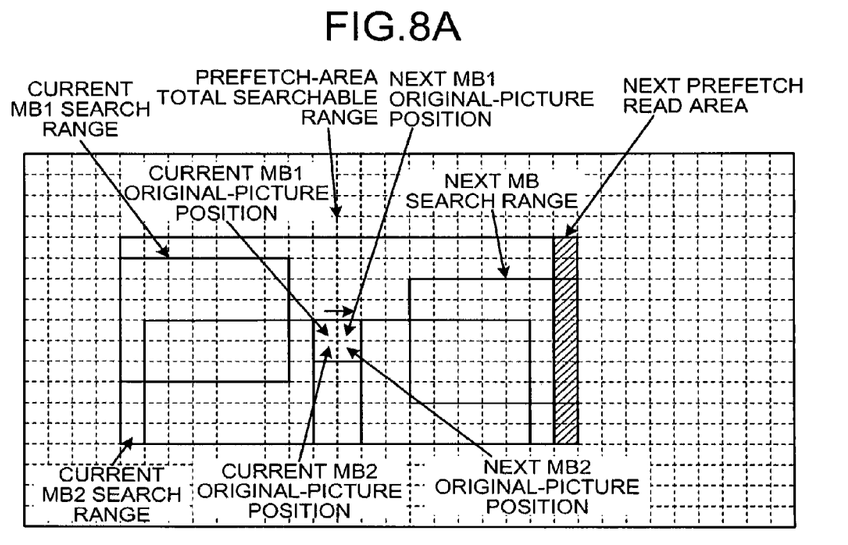
FIGS. 8A and 8B are schematic diagrams for explaining a motion-vector-search range area and a prefetch area according to the second embodiment.
Figure 8B:
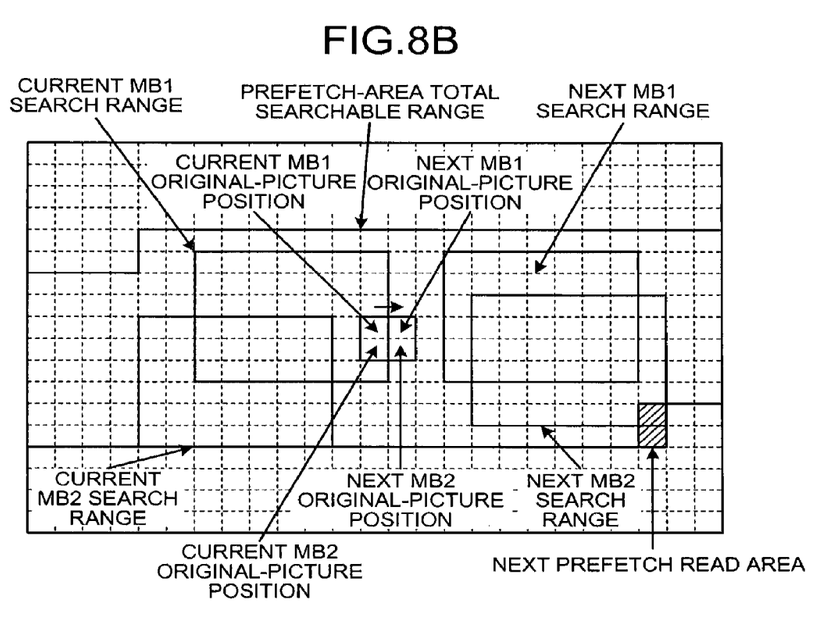
Figure 9:
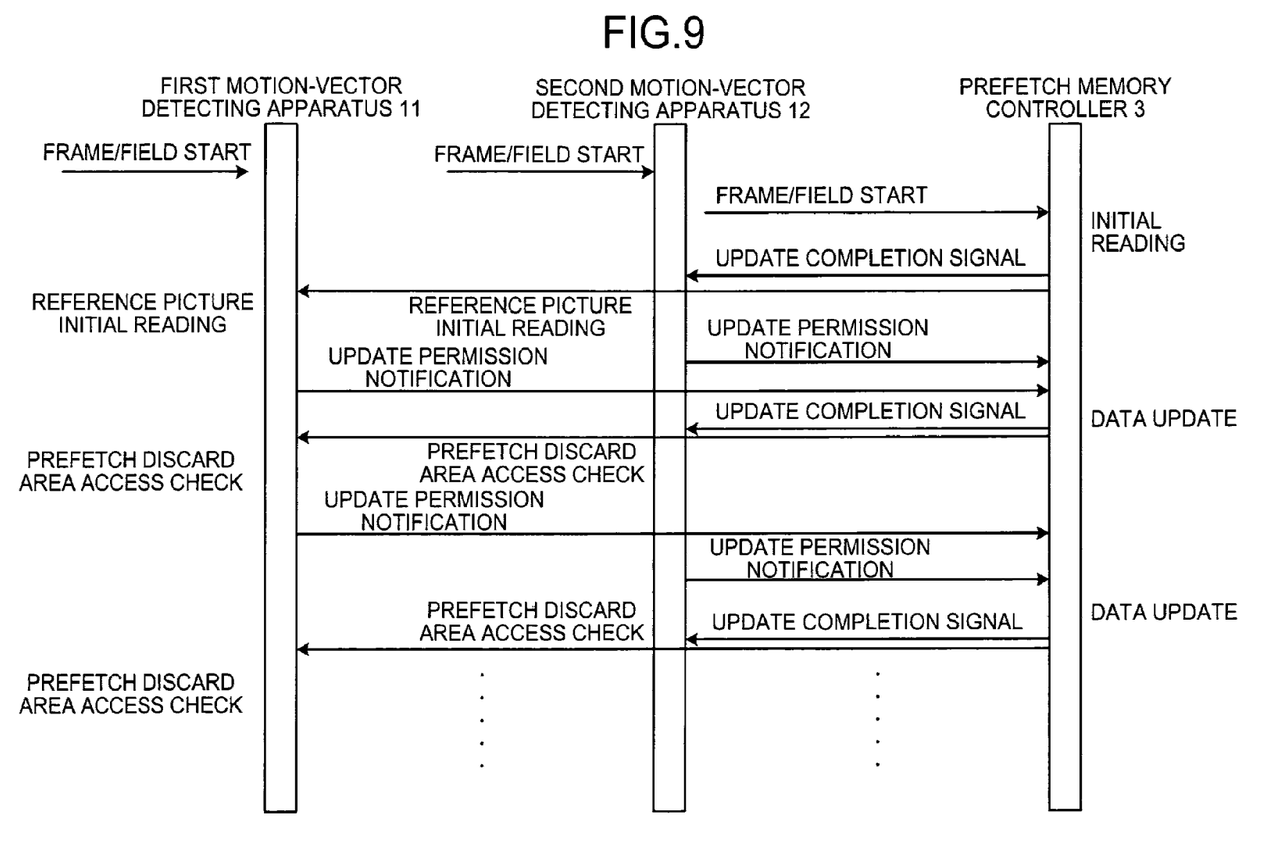
FIG. 9 is a sequence diagram for explaining an update process of data in the second embodiment.

The configuration of the motion vector detecting apparatus according to the second embodiment is explained with reference to FIGS. 7 to 9. FIG. 7 is a block diagram of the configuration of the motion vector detecting apparatus using a prefetch memory according to the second embodiment. FIGS. 8A and 8B are schematic diagrams for explaining a motion-vector-search range area and a prefetch area according to the second embodiment. FIG. 9 is a sequence diagram for explaining an update process of data in the second embodiment.

As shown in FIG. 7, a first motion-vector detecting apparatus 11 and a second motion-vector detecting apparatus 12 having similar configuration to that of the motion vector detecting apparatus 10 in the first embodiment carry out the reference picture access by sharing the prefetch memory 2. As shown in FIG. 8A, the process is allocated so that the MB addresses in a vertical direction are continuous. With this arrangement, the updating area of the prefetch memory 2 increases by only one MB in comparison with that when the "motion vector detecting apparatus" is one. FIG. 8B depicts the updating of data when the capacity of the prefetch memory 2 is large or when the size of the process picture data in a horizontal direction is small, as in the case of FIG. 2B.

In the above process, it is necessary to update the prefetch memory 2 by synchronizing plural "motion vector detecting apparatuses". Therefore, the prefetch memory controller 3 carries out an arbitration process (see the sequence diagram of FIG. 9).

As explained above, according to the second embodiment, the prefetch memory controller 3 controls so that the first motion-vector detecting apparatus 11 and the second motion-vector detecting apparatus 12 as plural motion vector detecting apparatuses process the MBs that are continuous in a vertical direction in parallel. The prefetch memory controller 3 prefetches the search area of the common motion vector processed by the first motion-vector detecting apparatus 11 and the second motion-vector detecting apparatus 12. Therefore, the utilization efficiency of the prefetch memory can be further increased.

Figure 10A:
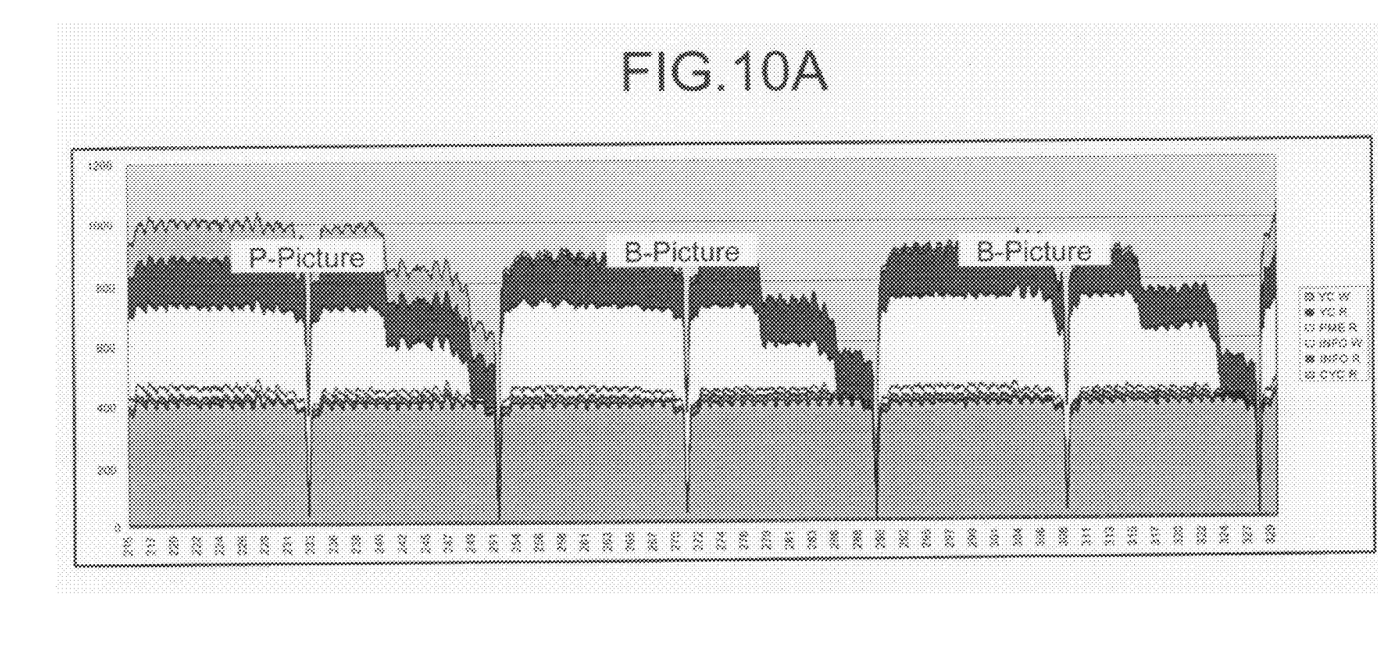
FIGS. 10A and 10B are graphs for explaining a bandwidth suppression effect according to the present invention.
Figure 10B:
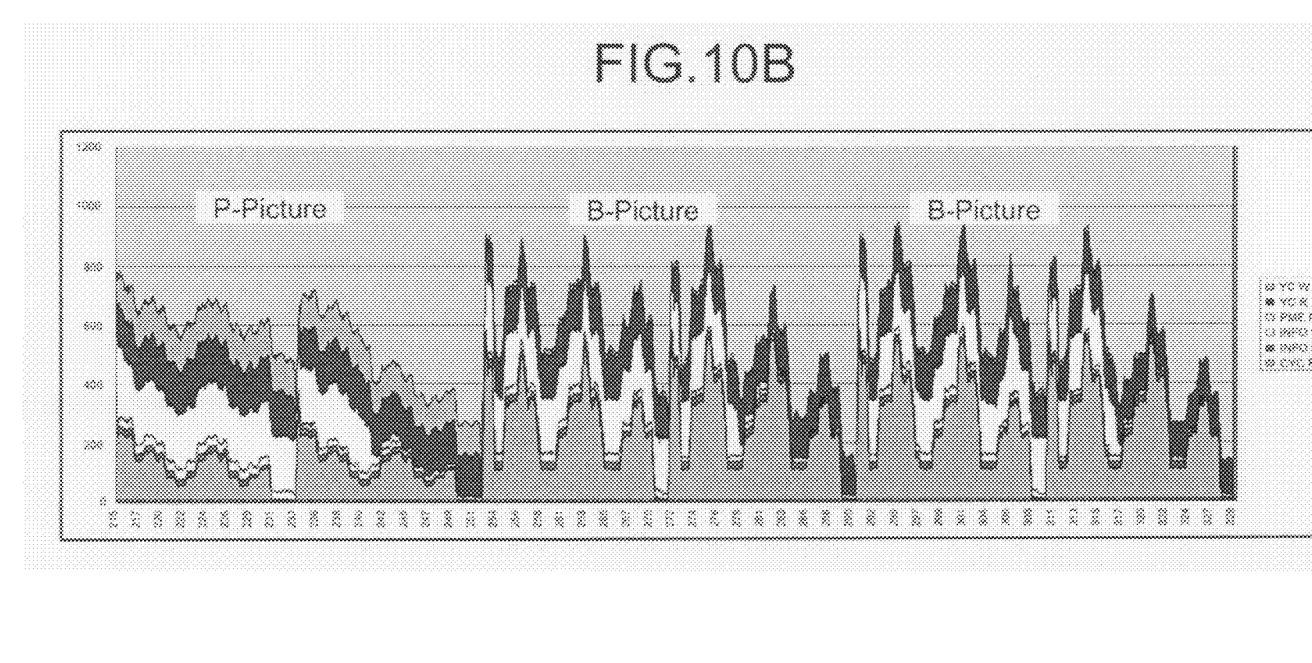

Validity of the motion vector detecting apparatus according to the present invention is verified by comparing a case with the prefetch memory control with a case without the prefetch memory control. A result of the verification is shown in FIGS. 10A and 10B. FIGS. 10A and 10B are graphs for explaining a bandwidth suppression effect according to the present invention.

In FIGS. 10A and 10B, the lateral axis expresses time, and the vertical axis expresses a data transfer amount (byte) in unit time. FIG. 10A depicts the bandwidth suppression effect when the prefetch is OFF, and FIG. 10B depicts the bandwidth suppression effect when the prefetch is ON.

As shown in FIGS. 10A and 10B, it is verified that when the prefetch is ON (see FIG. 10B), the band deletion effect is about 45% of that when the prefetch is OFF (see FIG. 10A).

According to the present invention, the encoding efficiency is high in the P-picture, and the hit rate of the prefetch memory becomes high in the B-picture. Therefore, degradation of picture quality can be avoided and the utilization efficiency of the prefetch memory can be increased.

According to the present invention, the utilization efficiency of the prefetch memory can be further increased.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A motion vector detecting apparatus for detecting a motion vector for each process-unit square data of an original picture frame, the motion vector detecting apparatus comprising:
    a storage unit that temporarily stores process-unit square data of a reference picture frame which is transferred from a prefetch memory, the prefetch memory temporarily storing the reference picture frame to be used to obtain a correlation for the original picture frame, the reference picture frame being transferred from a frame memory which stores frame data of a motion picture; and
    a controller that is connected to the storage unit to read out data from the storage unit and that, in encoding an interlace picture, changes over a reference picture in a field unit when the motion vector detection of a P-picture is performed, and changes over a reference picture in a frame unit when the motion vector detection of a B-picture is performed, and, changes over the original picture frame to perform the motion vector detection when a same reference picture is referred to by more than one of a B-picture and a P-picture.

2. The motion vector detecting apparatus according to claim 1, wherein
    the prefetch memory temporarily stores the reference picture frame from the frame data of the motion picture to obtain a correlation for each process-unit square data of the original picture frame.

3. The motion vector detecting apparatus according to claim 1, wherein
    the prefetch memory is a static random access memory (SRAM) embedded in a large-scale integration (LSI) on which the motion vector detecting apparatus is mounted.

4. A motion vector detecting method for processing more than one piece of process-unit square data of an original picture frame in parallel to detect a plurality of motion vectors, the more than one piece of process-unit square data being adjacent to each other in a vertical direction of the original picture frame the method comprising:

prefetching a common search area of the more than one piece of process-unit square data processed in parallel and storing the common search area in a common prefetch memory;

transferring reference picture data corresponding to the process-unit square data from the search area prefetched; and detecting a motion vector for each piece of process-unit square data, wherein the detecting includes, in encoding an interlace picture, changing over the reference picture data in a field unit when motion vector detection of a P-picture is performed, and changing over the reference picture data in a frame unit when motion vector detection of a B-picture is performed, and changing over the original picture frame to perform the motion vector detection when a same reference picture is referred to by more than one of a B-picture and a P-picture simultaneously.

* * * * *